US012792921B2

(12) United States Patent
Kadayam Viswanathan et al.

(10) Patent No.: US 12,792,921 B2
(45) Date of Patent: Nov. 10, 2026

(54) SYSTEM AND METHOD FOR SUPERVISED LEARNING OF PERMEABILITY OF EARTH FORMATIONS

(71) Applicant: Schlumberger Technology Corporation, Sugar Land, TX (US)

(72) Inventors: Ravinath Kausik Kadayam Viswanathan, Sharon, MA (US); Lalitha Venkataramanan, Lexington, MA (US); Prakhar Srivastava, Pune (IN); Augustin Prado, Issy-les-moulineaux (FR); Noyan Evirgen, Ankara (TR); MaryEllen Loan, Quincy, MA (US); Harish Datir, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 1189 days.

(21) Appl. No.: 17/310,965

(22) PCT Filed: Mar. 9, 2020

(86) PCT No.: PCT/US2020/021736

§ 371 (c)(1),
(2) Date: Sep. 2, 2021

(87) PCT Pub. No.: WO2020/185697

PCT Pub. Date: Sep. 17, 2020

(65) Prior Publication Data

US 2022/0156595 A1 May 19, 2022

Related U.S. Application Data

(60) Provisional application No. 62/816,566, filed on Mar. 11, 2019, provisional application No. 62/815,714, filed on Mar. 8, 2019.

(51) Int. Cl.
*G06N 20/00* (2019.01)
*E21B 49/00* (2006.01)
(Continued)

(52) U.S. Cl.
CPC ............ *G06N 3/088* (2013.01); *G06N 3/045* (2023.01); *G06N 3/047* (2023.01); *G06N 20/00* (2019.01);
(Continued)

(58) Field of Classification Search
USPC ........................................................ 706/15
See application file for complete search history.

(56) References Cited

U.S. PATENT DOCUMENTS

| | | | | |
|---|---|---|---|---|
| 5,251,286 A * | 10/1993 | Wiener | G01V 11/00 73/152.16 |
| 7,309,983 B2 | 12/2007 | Freedman | |

(Continued)

FOREIGN PATENT DOCUMENTS

| | | |
|---|---|---|
| CN | 104635265 A | 5/2015 |
| CN | 105781536 A | 7/2016 |
| CN | 107728231 A | 2/2018 |

OTHER PUBLICATIONS

Petrov et al, T2 distribution mapping profiles with phase-encode MRI, Journal of Magnetic Resonance Mar. 2011 pp. 39-46 (Year: 2011).*

(Continued)

*Primary Examiner* — Omar F Fernandez Rivas
*Assistant Examiner* — Em N Trieu
(74) *Attorney, Agent, or Firm* — Jeffrey D. Frantz

(57) ABSTRACT

Embodiments herein include a method for characterizing a rock formation sample. The method for characterizing a rock formation sample includes obtaining a plurality of data sets characterizing the rock formation sample. The method fur-
(Continued)

ther includes training a neural network to generate a computational model. Moreover, the method additionally includes using the plurality of data sets as input to the computational model, wherein the computational model may be implemented by a processor that derives an estimate of permeability of the rock formation sample.

20 Claims, 10 Drawing Sheets

(51) Int. Cl.
*G06N 3/045* (2023.01)
*G06N 3/047* (2023.01)
*G06N 3/088* (2023.01)

(52) U.S. Cl.
CPC ......... *E21B 49/005* (2013.01); *E21B 2200/22* (2020.05)

(56) References Cited

U.S. PATENT DOCUMENTS

| | | | | |
|---|---|---|---|---|
| 9,874,551 | B2 | 1/2018 | Herron et al. | |
| 10,109,209 | B1 * | 10/2018 | Buchmueller | G05D 1/106 |
| 10,971,161 | B1 * | 4/2021 | Vilke | H04L 65/611 |
| 2002/0099504 | A1 | 7/2002 | Cross et al. | |
| 2010/0254217 | A1 * | 10/2010 | Chu | G01V 1/30<br>367/38 |
| 2011/0295510 | A1 * | 12/2011 | Gulati | G01V 1/28<br>345/419 |
| 2013/0124171 | A1 * | 5/2013 | Schuette | G06F 30/20<br>703/2 |
| 2014/0285196 | A1 * | 9/2014 | Liu | G01R 33/54<br>324/309 |
| 2015/0240633 | A1 | 8/2015 | Akkurt et al. | |
| 2016/0105218 | A1 | 4/2016 | Henry et al. | |
| 2018/0003786 | A1 * | 1/2018 | Washburn | G01N 23/04 |
| 2018/0033119 | A1 * | 2/2018 | Harbaugh | G01S 13/00 |
| 2019/0017374 | A1 * | 1/2019 | Misra | E21B 49/00 |
| 2020/0160173 | A1 * | 5/2020 | Pandey | G01V 20/00 |
| 2020/0183046 | A1 * | 6/2020 | Wheelock | G01V 1/282 |

OTHER PUBLICATIONS

Lashore at al. A Numerical Investigation of Stochastic and Determininstic Upscaling Methods for Permeability Fields; Using SVD and HOSVD Reduction Models, School of Engineering, University of Aberdeen, UK, b.lashore@abdn.ac.uk, Jun. 2018, p. 1-3 (Year: 2018).* 2018.*

International Preliminary Report on Patentability of the PCT Application PCT/US2020/021736 dated Sep. 23, 2021, 6 pages.

First Office Action issued in Chinese Patent Application No. 2020800331019X dated May 17, 2024, 26 pages with English translation.

Communication pursuant to Article 94(3) issued in European Patent Application No. 20771047.6 dated Jan. 3, 2025, 8 pages.

Prado, A. et al., "Dual Neural Network Architecture for Determining Epistemic and Aleatoric Uncertainties", arXiv:1910.06153v1, Oct. 10, 2019, 33rd Conference on Neural Informtion Processing Sysems, Vancouver, Canada, 5 pages.

Czarnecki, W. M. et al., "Machine Learning with Known Input Data Uncertainty Measure", IFIP International Conference on Computer Information Systems and Industrial Management, 2017, pp. 279-388.

Dehghani, M. et al. "Neural Ranking Models with Weak Supervision," Proceedings of the 40th International ACM SIGIR Conference on Research and Development in Information Retrieval. ACM, 2017, 10 pages.

Dehghani, M. et al., "Learning to Rank from Samples of Variable Quality", presented at the First International SIGIR2016 Workshop on Learning from Limited or Noisy Data for Information Retrieval, 2018, 4 pages.

Gal, Y. et al., "Dropout as a Bayesian Approximation: Representing Model Uncertainty in Deep Learning", presented at the Proceedings of the 33rd International Conference on Machine Learning, New York, New York, USA, 2016, 10 pages.

Gal, Y. et al., "Concrete Dropout", presented at the 31st Conference on Neural Information Processing Systems, Long Beach, California, USA, 2017, 10 pages.

Hafner, D. et al. "Reliable Uncertainty Estimates in Deep Neural Networks Using Noise Contrastive Priors", 2018, 14 pages.

Kuleshov, V. et al., "Accurate Uncertainties for Deep Learning Using Calibrated Regression." 2018, 9 pages.

Mullachery, V. et al., "Bayesian Neural Networks", 2018, 16 pages.

Oliveira, R. et al., "Known Unknowns: Uncertainty Quality in Bayesian Neural Networks," presented at the Workshop on Bayesian Deep Learning, NIPS 2016, Barcelona Spain, 7 pages.

Reed, S. et al. "Training Deep Neural Networks on Noisy Labels with Bootstrapping, " 2014, 11 pages.

Allen, D. F. et al., "Trends in NMR Logging", Schlumberger Oilfield Review, 2000, 12, pp. 2-19.

Foley, I. et al. "Effect of Paramagnetic ions on NMR Relaxation of Fuids at Solid Surfaces". In: Journal of Magnetic Resonance, Series A, 1996, 123(1), pp. 95-104.

Freedman, R., "Advances in NMR Logging", Journal of Petroleum Technology, 2006, 58(1), pp. 60-66.

Herron, M. M., "Estimating the Intrinsic Permeability of Clastic Sediments from Geochemical Data", presented at the SPWLA 28th Annual Logging Symposium, London, England, 1987, 23 pages.

Herron, M. M. et al., "A Robust Permeability Estimator for Siliciclastics", SPE 49301, presented at the SPE Annual Technical Conference and Exhibition, New Orleans, Louisiana, USA, 1998, pp. 777-787.

Keating, K. et al. "A laboratory study of the effect of magnetite on NMR relaxation rates", Journal of Applied Geophysics, 2008, 66(3-4), pp. 188-196.

Kenyon, W. E., et al., "A Three-Part Study of NMR Longitudinal Relaxation Properties of Water-Saturated Sandstones", SPE 15643, SPE Formation Evaluation, 1988, 3(3), pp. 622-636.

Souza, A. et al. "Permeability Prediction Improvement Using 2D NWR Diffusion-T2 Maps", presented at the SPWLA 54th Annual Logging Symposium, New Orleans, Louisiana, USA, 2013, 16 pages.

Timure, A. et al., "An investigation of permeability, porosity, and residual water saturation relationships", presented at the SPWLA 9th Annual Logging Symposium, New Orleans, Louisiana, USA, 1968, 18 pages.

Venkataramanan, L. et al., "Experimental Study of the Effects of Wettability and Fluid Saturation on Nuclear Magnetic Resonance and Dielectric Measurements in Limestone", Petrophysics, 2014, 55(6), pp. 572-586.

Kukal, G. C., Simons, K. E. (Dec. 1, 1986). Log Analysis Techniques for Quantifying the Permeability of Submillidarcy Sandstone Reservoirs. Society of Petroleum Engineers. doi:10.2118/13880-PA, SPE-13880 (14 pages).

Neal, R. M. (2012). Bayesian learning for neural networks (vol. 118). Springer Science Business Media, p. 10-17.

International Search Report and Written Opinion of the PCT Application PCT/US2020/021736, dated Jun. 12, 2020 (12 pages).

Extended Search Report issued in European Patent Application No. 20771047.6 dated Nov. 10, 2022, 10 pages.

Zhu, L-q. et al., "Permeability Prediction of the Tight Sandstone Reservoirs Using Hybrid Intelligent Algorithm and Nuclear Magnetic Resonance Logging Data", Arabian Journal for Science and Engineering, 2017, 42(4), 12 pages.

Hamada, G. M. et al., "Neural network prediction of porosity and permeability of heterogeneous gas sand reservoirs using NMR and conventional logs", Jan. 1, 2010, Retrieved from the Internet on Sep. 3, 2020: [https://hrcak.srce.hr/file/90450], 10 pages.

Olayiwola, T., "Application of Artificial Neural Network to Estimate Permeability From Nuclear Magnetic Resonance Log" SPE-189294-STU, presented at the SPE International Student Paper Contest st the SPE Annual Technical Conference and Exhibition held in San Antonio, Texas, U.S.A., 2017, 10 pages.

(56) References Cited

OTHER PUBLICATIONS

Plastino, A. et al., "Combining classification and regression for improving permeability estimations from 1H NMR relaxation data", Journal of Applied Geophysics, 2017, 147, pp. 95-102.

* cited by examiner

200

500

600

900

SYSTEM AND METHOD FOR SUPERVISED LEARNING OF PERMEABILITY OF EARTH FORMATIONS

RELATED APPLICATIONS

This application is a National Stage Entry of International Application No. PCT/US2020/021736, filed Mar. 9, 2020, which claims the benefit of U.S. Provisional Application No. 62/815,714, filed on Mar. 8, 2019, and U.S. Provisional Application No. 62/816,566, filed on Mar. 11, 2019; the contents of which are incorporated herein by reference.

FILED OF THE INVENTION

The present disclosure relates to supervised learning of permeability of earth formations and, more specifically, to a system and method for supervised learning of permeability of earth formations.

BACKGROUND

In appraising a reservoir, permeability is an important required petrophysical parameter of a geological rock formation, otherwise known as earth formation. Specifically, the accurate determination of permeability is important for understanding the value of a reservoir. Moreover, it is an important input in the reservoir models that predict hydrocarbon production. While several methods have been developed for the determination of permeability that utilize different well logs and core measurement, issues surrounding the heteroscedasticity of data remain a challenge.

SUMMARY

This summary is provided to introduce a selection of concepts that are further described below in the detailed description. This summary is not intended to identify essential features of the claimed subject matter, nor is it intended to be used as an aid in limiting the scope of the claimed subject matter.

In an embodiment of the present disclosure, a method for characterizing a rock formation sample is provided. The method for characterizing a rock formation sample may include obtaining a plurality of data sets characterizing the rock formation sample. The method for characterizing a rock formation sample may further include training a neural network to generate a computational model. Moreover, the method for characterizing a rock formation sample may additionally include using the plurality of data sets as an input to the computational model, wherein the computational model may be implemented by a processor that derives an estimate of permeability of the rock formation sample.

One or more of the following features may be included. The computation model may be based on training an artificial neural network. The computational model may further derive a value representing uncertainty associated with the estimate of permeability of the rock formation sample. The computation model may be based on training a Bayesian neural network and/or an artificial neural network that employs Bayesian inference using dropout. The plurality of data sets may include data derived from nuclear magnetic resonance (NMR) measurements for the rock formation sample. The plurality of data sets may include $T_2$ feature data. The $T_2$ feature data may be derived by encoding a $T_2$ distribution of a rock sample using a Singular Valued Decomposition ("SVD") based kernel and then mapping the $T_2$ distribution data to $T_2$ features in a reduced dimensional space. The plurality of data sets may include minerology data corresponding to the rock formation sample. The rock formation sample may be selected from the group consisting of rock chips, rock core, rock drill cuttings, rock outcrop, or a rock formation surrounding a borehole and coal.

In another embodiment of the present disclosure, a system for characterizing a rock formation sample is provided. The system for characterizing a rock formation system may include a memory storing a plurality of data sets characterizing a rock formation sample. The system for characterizing a rock formation may further include a processor configured to train a neural network to generate a computational model, wherein the plurality of data sets are input to the computational model and wherein the computational model is implemented by a processor that derives an estimate of permeability of the rock formation sample.

One or more of the following features may be included. The computation model may be based on training at least one of an artificial neural network or a Bayesian neural network. The computational model may further derive a value representing uncertainty associated with the estimate of permeability of the rock formation sample. The computation model may be based on training an artificial neural network that employs Bayesian inference using dropout.

In another embodiment of the present disclosure, a method for supervised learning of petrophysical parameters of earth formations is provided. The method for supervised learning of petrophysical parameters of earth formations may include obtaining a plurality of data sets characterizing a sample. The method for supervised learning of petrophysical parameters of earth formations may further include providing a neural network having one or more dropouts. A low fidelity dataset associated with the plurality of data sets may be used to train a computational model.

One or more of the following features may be included. The computational model may be fine-tuned with a high fidelity data set. The neural network may be a Bayesian neural network. A first autoencoder may be trained using the low fidelity dataset. A second autoencoder may be trained using the high fidelity dataset. At least one parameter associated with the first autoencoder or the second autoencoder may be frozen.

BRIEF DESCRIPTION OF THE DRAWINGS

The present invention is illustrated by way of example, and not limitation, in the figures of the accompanying drawings in which like references indicate similar elements and in which:

FIG. 11 is a diagram depicting an embodiment of a system in accordance with the present disclosure.

DESCRIPTION

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Figure 1:
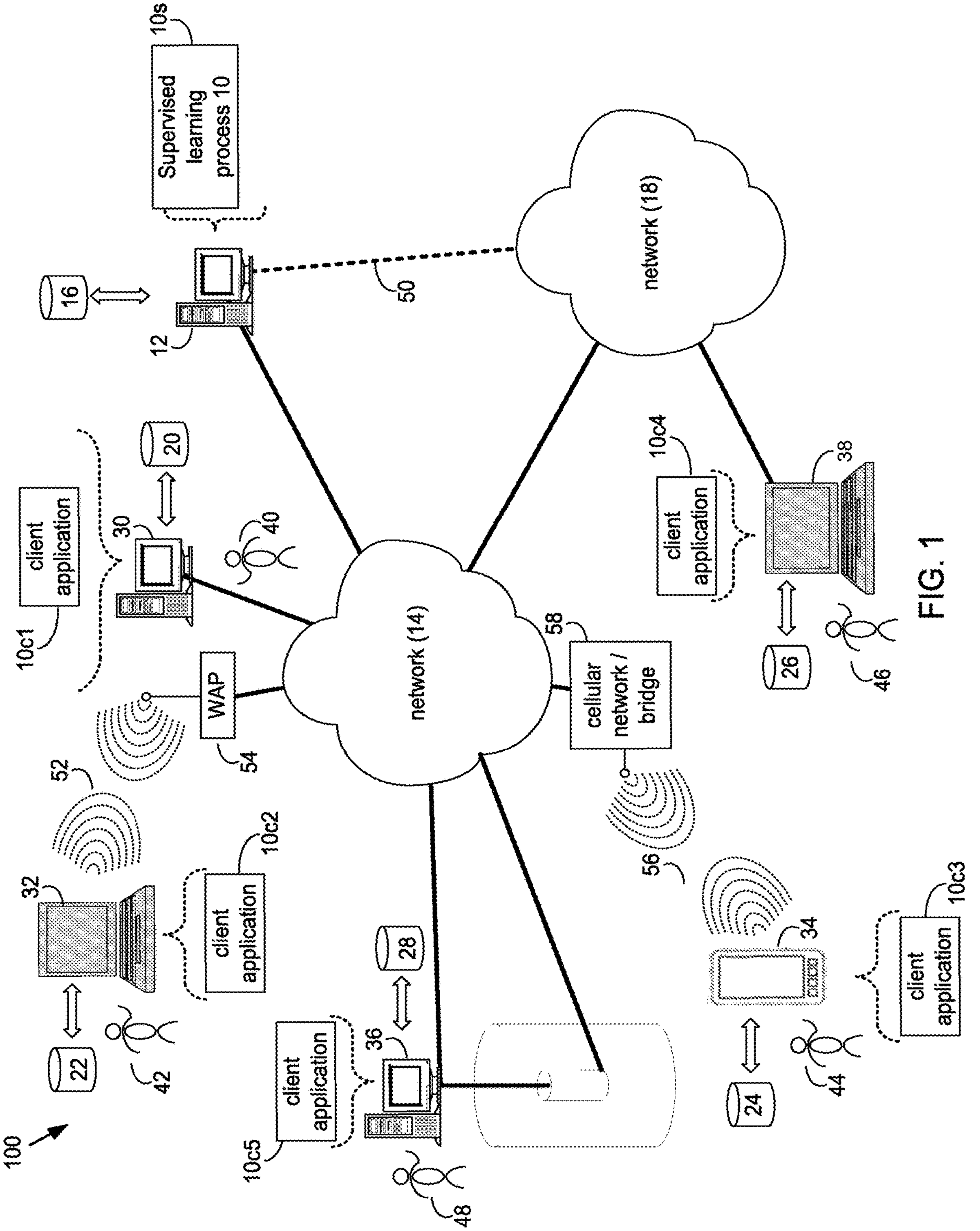
FIG. 1 is a diagram depicting an embodiment of a system in accordance with the present disclosure.

Referring to FIG. 1, there is shown a method 100 for supervised learning of petrophysical parameters and a method for characterizing a rock formation sample, both of which are denoted herein as supervised learning process 10. For the following discussion, it is intended to be understood that supervised learning process 10 may be implemented in a variety of ways. For example, supervised learning process 10 may be implemented as a server-side process, a client-side process, or a server-side/client-side process.

For example, supervised learning process 10 may be implemented as a purely server-side process via supervised learning process 10*s*. Alternatively, supervised learning process 10 may be implemented as a purely client-side process via one or more of client-side application 10*c*1, client-side application 10*c*2, client-side application 10*c*3, and client-side application 10*c*4. Alternatively still, supervised learning process 10 may be implemented as a server-side/client-side process via server-side supervised learning process 10*s* in combination with one or more of client-side application 10*c*1, client-side application 10*c*2, client-side application 10*c*3, client-side application 10*c*4, and client-side application 10*c*5. In such an example, at least a portion of the functionality of supervised learning process 10 may be performed by supervised learning process 10*s* and at least a portion of the functionality of supervised learning process 10 may be performed by one or more of client-side application 10*c*1, 10*c*2, 10*c*3, 10*c*4, and 10*c*5.

Accordingly, supervised learning process 10 as used in this disclosure may include any combination of supervised learning process 10*s*, client-side application 10*cl*, client-side application 10*c*2, client-side application 10*c*3, client-side application 10*c*4, and client-side application 10*c*5.

Supervised learning process 10*s* may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of supervised learning process 10*s*, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

The instruction sets and subroutines of client-side application 10*c*1, 10*c*2, 10*c*3, 10*c*4, 10*c*5 which may be stored on storage devices 20, 22, 24, 26, 28 (respectively) coupled to client electronic devices 30, 32, 34, 36, 38 (respectively), may be executed by one or more processors (not shown) and one or more memory architectures (not shown) incorporated into client electronic devices 30, 32, 34, 36, 38 (respectively). Examples of storage devices 20, 22, 24, 26, 28 may include but are not limited to: hard disk drives; tape drives; optical drives; RAID devices; random access memories (RAM); read-only memories (ROM), and all forms of flash memory storage devices.

Examples of client electronic devices 30, 32, 34, 36, 38 may include, but are not limited to, personal computer 30, 36, laptop computer 32, mobile computing device 34, notebook computer 38, a netbook computer (not shown), a server computer (not shown), a gaming console (not shown), a data-enabled television console (not shown), and a dedicated network device (not shown). Client electronic devices 30, 32, 34, 36, 38 may each execute an operating system.

Users 40, 42, 44, 46, 48 may access supervised learning process 10 directly through network 14 or through secondary network 18. Further, supervised learning process 10 may be accessed through secondary network 18 via link line 50.

The various client electronic devices (e.g., client electronic devices 30, 32, 34, 36, 38) may be directly or indirectly coupled to network 14 (or network 18). For example, personal computer 30 is shown directly coupled to network 14. Further, personal computer 30 is shown wirelessly coupled to network 14 via wireless communication channels 52 established between personal computer 30 and wireless access point (WAP) 54. Similarly, mobile computing device 34 is shown wirelessly coupled to network 14 via wireless communication channel 56 established between mobile computing device 34 and cellular network/bridge 58, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between laptop computer 30 and WAP 54. Additionally, notebook computer 38 is shown directly coupled to network 18 via a hardwired network connection.

As generally discussed above, a portion and/or all of the functionality of supervised learning process 10 may be provided by one or more of client side applications 10*c*1-10*c*5. For example, in some embodiments supervised learning process 10 (and/or client-side functionality of supervised learning process 10) may be included within and/or interactive with client-side applications 10*c*1-10*c*5, which may include client side electronic applications, web browsers, or another application. Various additional/alternative configurations may be equally utilized.

Regarding determining the permeability of a geological rock, there have been several models developed over the years. Specifically, the known models include measurements of well log and core data to determine permeability determination. For example, the models may include KSDR and Timur-Coates models. Based on early research done on sandstones, an estimation of permeability of a rock sample, referred to as $k_{SDR}$, may be empirically derived, as shown in Equation 1 below:

$$k_{SDR} = A\varphi^b T_{2,LM}^c \qquad \text{Equation 1}$$

In Equation 1, φ is the porosity of the rock sample, $T_{2,LM}$ is the logarithmic mean of the $T_2$ distribution of the rock sample and A is the formation-dependent scalar factor. The parameters b and c can be empirically determined through calibration with core measurements. Further an estimation of permeability of a rock sample, referred to as $k_\rho$, may be derived through inclusion of a surface relaxivity of the rock sample, as shown below in Equation 2:

$$k_\rho = A\varphi^b(\rho_2 T_{2,LM})^c \qquad \text{Equation 2}$$

In Equation 2, the relaxivity, $\mu_2$, can be estimated either from diffusion-relaxation (D-T2) maps or from comparison of NMR and mercury injection porosimetry (MICP) data. Unfortunately, estimating relaxivity with either of the previous mentioned methods is time consuming and challenging. Estimating the surface relaxivity from the mineralogy is also challenging as even though there should be an underlying relationship between relaxivity and the concentration of paramagnetic elements (Fe and Mn), the exact functional form of the relationship is unknown.

The Timur-Coates model for permeability of a rock sample, referred to as $k_{TC}$, is represented below in Equation 3:

$$k_{TC} = B\varphi^4\left(\frac{FFV}{BFV}\right)^2 \qquad \text{Equation3}$$

Figure 2:
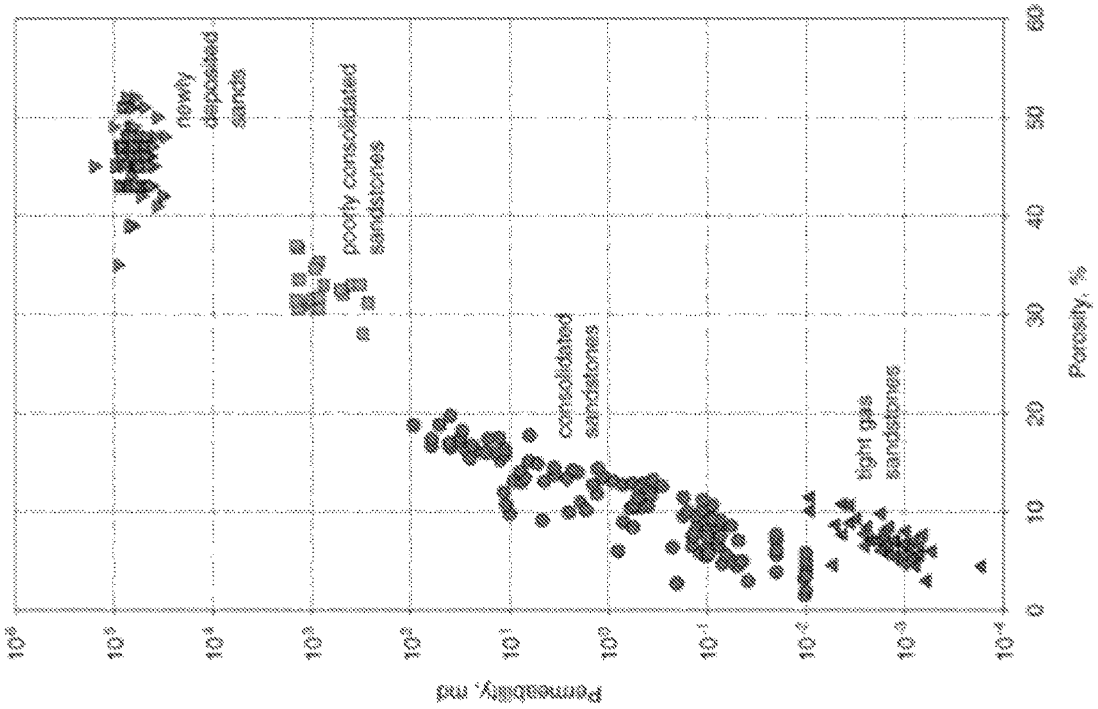
FIG. 2 is a plot diagram representing permeability of a rock sample in accordance with the present disclosure.

In Equation 3, B is a scalar factor, and FFV and BFV represent free fluid and bound fluid volumes, respectively, of the rock sample. FFV and BFV can be obtained from $T_2$ distributions of the rock sample with appropriate mineralogy dependent cut-offs. Further, the parameters in the above models (such as A and B) can be calculated through lab tests, where the ground truth rock permeability is measured with helium or nitrogen gas flow measurements on core samples and the results correlated with measured $T_2$ distributions of the core samples. Different studies have also shown a strong correlation between the porosity and permeability for different rock types. This concept is illustrated in FIG. 2, which shows the strong permeability-porosity correlation for different rock types or mineralogy. Specifically, FIG. 2 is a plot 200 of permeability versus porosity for 4 data sets from sands and sandstones, illustrating the decrease in permeability and porosity that occurs as pore dimensions are reduced with the alteration of minerals.

Further, regarding capturing, with high accuracy, highly intricate underlying nonlinearity present in data collected in regards to the permeability of a geological rock, deep-learning (DL) based regression methods may be used. However, the DL based regression methods present challenges, specifically in regard to their large-scale uptake in industrial applications. For example, one challenge faced may include that some, if not most, algorithms do not address the highly heteroscedastic nature of data usually found in industrial applications, in terms of noise fidelity. Existing solutions work to tackle low and high fidelity data sets in terms of noise in output labels and combine them to have a more accurate model. To obtain better accuracy, models may be trained on low fidelity data and then fine-tuned on high fidelity data. Incorporating noisy output labels in a machine learning workflow is another option. However, methods to incorporate input noise do not appear to have been addressed where training data is jittered using a known uncertainty.

Another example of a challenge presented by using DL based regression methods includes the fact that conventional algorithms can lack the value of information (VOI) aspect while making predictions. They typically provide point estimates without giving any indication of the associated uncertainties for their predictions. For example, two different deep learning methods have been proposed to include uncertainty. One method includes incorporating one or more uncertainties through Bayesian inference. The essential idea is to assign a mean and variance to each weight parameter in the neural network and then perform back-propagation based on variational inference, instead of the usual sampling-based methods, which allows the computations to be done on a GPU, significantly improving its speed. A second variational approach uses the idea of 'dropout'. Traditionally, dropouts have been used to prevent overfitting by a model. They work by randomly switching off neurons based on a certain Bernoulli parameter during training phase of the neural network. This forces the neurons to not co-depend on each other and forces them to learn unique, distinguishable features. Dropout segments remain active in a training phase but not in a testing phase. During the testing phase, their outputs are essentially multiplied by a factor dependent on dropout's Bernoulli parameter to keep the expectation of the activations same as what would have been in the training phase. Dropout may be further used to estimate uncertainties by essentially keeping them activated during the testing phase. Accordingly, such a network may be approximately equivalent to a deep Gaussian Process. However, a significant drawback is that the choice of Bernoulli parameter for each dropout segment is manually set, i.e., it is a hyper-parameter. Optimizing the hyper-parameter requires grid-search and for heavy neural networks, the computational cost can be prohibitively high. Concrete Dropout segments essentially replace dropout's discrete Bernoulli distribution with its continuous relaxation, i.e., the concrete distribution relaxation. This relaxation allows re-parametrization of the distribution and essentially makes the parameters learnable. When used in conjunction with heteroscedastic loss, instead of the usual MSE, architectures with Concrete Dropout segments may yield well-calibrated predictive uncertainties. Further, all machine learning techniques only work when a test data set is within a distribution of a training data set. When this assumption is violated and the input test data point is out-of-distribution (OOD), conventional methods fail silently, without raising an alarm of possible model failure.

Figure 3:
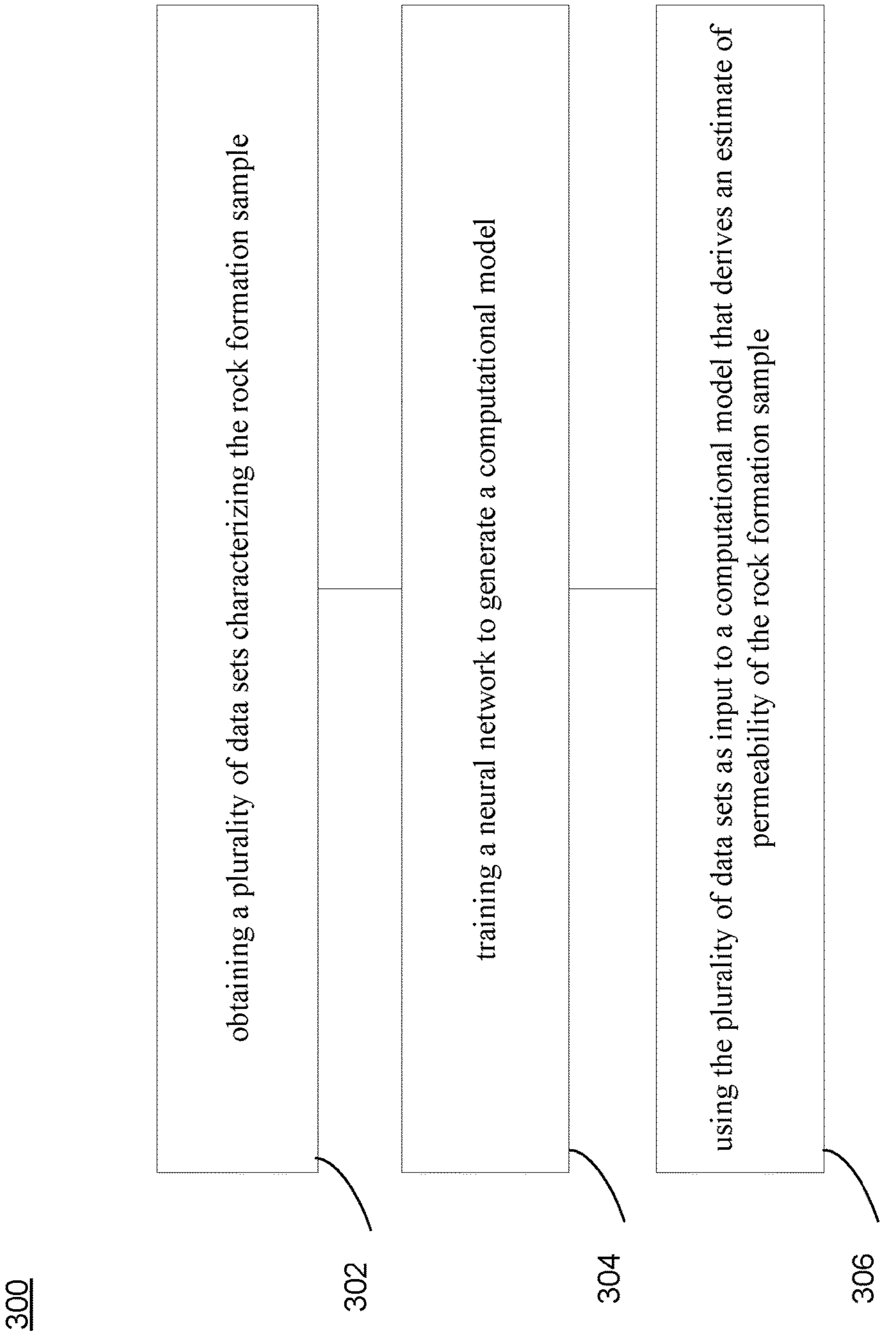
FIG. 3 is diagram of a flowchart depicting an embodiment of a method in accordance with the present disclosure.

Referring now to FIG. 3, a flowchart 300 showing an example of supervised learning process 10 is provided. In some embodiments, supervised learning process 10 may include obtaining 302 a plurality of data sets characterizing a rock formation sample. Supervised learning process 10 may further include training 304 a neural network to generate a computational model. Further, supervised learning process 10 may include using 306 the plurality of data sets as input to the computational model, wherein the computational model may be implemented by a processor that derives an estimate of permeability of the rock formation sample. Supervised learning process 10 may take into account the heteroscedasticity of data (i.e., varying levels of noise fidelity across one or more samples). In addition to point estimates, supervised learning process 10 may also provide one or more confidence intervals for the predicted measurement. Supervised learning process 10 may include metrics for checking the calibration of one or more uncertainties.

In some embodiments, supervised learning process 10 may use the one or more calibrated uncertainties to classify testing data points as being in or OOD with respect to the training data points and may also provide a metric for measuring the performance of the predictive uncertainties as an indicator for OOD data. In general, supervised learning process 10 may give equal importance to all the input data points. For example, in oilfield applications, different data points may come from different legacy tools, with varying degrees of uncertainty. Further, supervised learning process 10 may provide a point estimate of the desired output, usually by minimizing the l2 norm between one or more predictions and a ground truth. Supervised learning process 10 may provide one or more point estimates as well as one or more confidence intervals of the predicted measurement while simultaneously balancing both the accuracy and precision of the outputs. Further, supervised learning process 10 may include one or more metrics which can measure the calibration of the one or more confidence intervals. Additionally, supervised learning process 10 may use the one or more calibrated uncertainties to classify testing data points as being in or OOD with respect to the training data points and also provide a metric for measuring the performance of the predictive uncertainties as an indicator for OOD data. Supervised learning process 10 may ensure the following three main points: (1) honor noise information present in inputs and outputs of the model, in training data set; (2) provide one or more confidence intervals for each predicted output on a test data set and perform a quality check on the obtained one or more uncertainties; and (3) efficiently deal with unbalanced multi-fidelity data sets.

In some embodiments, supervised learning process 10 may present a new probabilistic programming pipeline, also denoted as a computational workflow and computational model, for determining a petrophysical parameter (i.e., permeability) of a geological rock formation. Supervised learning process 10 may use NMR relaxation ($T_2$) data measured from a sample of a geological rock formation as well as mineralogy data corresponding to the sample of the geological rock formation. The pipeline may be flexible to modify the feature space based on other measurements. In some embodiments, supervised learning process 10 may employ machine learning in the programing pipeline to learn a computation model (i.e., mapping of f) between a set of input features x (i.e. $x_1, x_2, x_3, \ldots, x_p$) and a real valued output y (i.e., permeability), that minimizes the means squared error (MSE), as shown in Equation 4 below:

$$\frac{1}{n}\sum(f(x)-y)^2 \qquad \text{Equation 4}$$

Figure 4:
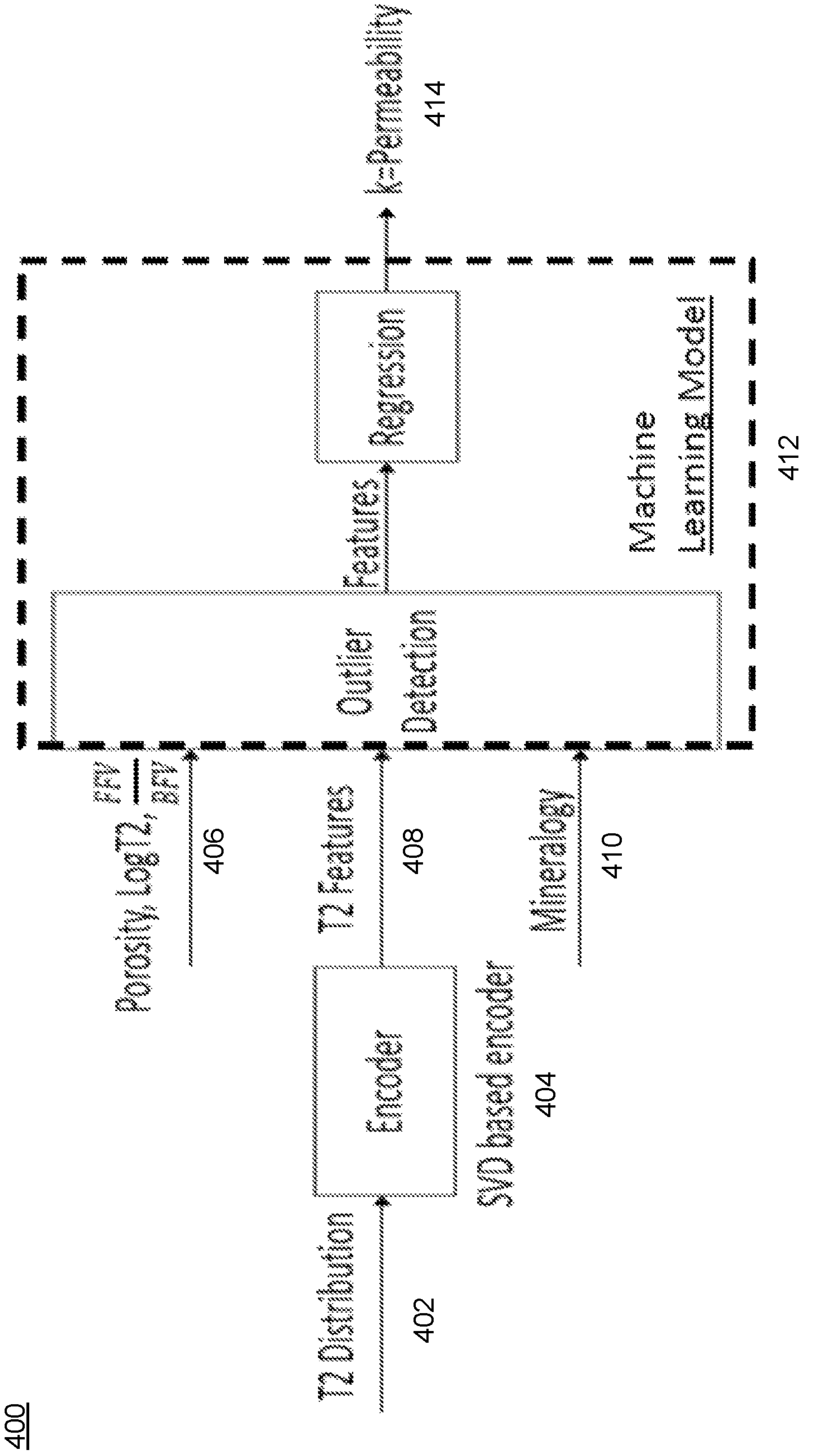
FIG. 4 is a block diagram depicting an embodiment of a system in accordance with the present disclosure.

In some embodiments, supervised learning process 10 may include a preprocessing stage that prepares data of a set of input features. For example, the preprocessing stage may encode the $T_2$ distribution of a sample using a Singular Valued Decomposition (SVD) based kernel and then map the $T_2$ distribution data which is encoded in a higher dimensional space (i.e., 64 dimensions) to $T_2$ features in a reduced dimensional space (i.e., 6 dimensions). The general workflow 400 of the programming pipeline is illustrated in FIG. 4. First, $T_2$ distribution 402 may be encoded using an SVD-based encoder 404. Then, NMR features of the sample 406 (i.e., porosity, Bound Free Volume ratio, and a $T_2$ Logarithmic Mean derived from NMR measurements of a sample), $T_2$ features 408 in the reduced dimensional space (i.e., as output from the preprocessing stage) and minerology data 410 corresponding to the rock sample (i.e., concentrations for a set of mineral components commonly found in geological rock samples) may be combined and input to the machine learning model 412 to predict permeability 414 of the rock sample. The quality of the computation model may be determined through cross validation.

In some embodiments, NMR measurements may be performed on rock chips, rock cores, rock drill cuttings or other samples of a geological rock formation by an NMR spectroscopy machine in a surface laboratory or surface well site. Alternatively, the NMR measurements may be performed on parts or samples of a geological rock formation surrounding a borehole by an NMR logging tool as part of a wellbore logging measurement.

In some embodiments, the mineralogy data may be determined from X-ray diffraction or infrared spectroscopy measurements performed on a rock sample performed in a surface laboratory or surface well site. Such spectroscopy measurements may be performed on rock chips, rock cores, rock drill cuttings or other samples of a geological rock formation by an NMR spectroscopy machine in a surface laboratory or surface well site. These methods may be considered 'direct measurements' of mineralogy because each produces a spectrum in which is comprised information about the mineral identity (i.e., position of the spectrum signal, generally plotted on the horizontal axis) and about the mineral component concentration (intensity of the spectrum signal, generally plotted on the vertical axis). However, these methods are generally not available downhole within a wellbore.

In some embodiments, methods may be employed to determine mineralogy in part(s) or sample(s) of one or more geological rock formations surrounding a borehole from wellbore logging measurements. However, these methods are more challenging because the determination may rely upon 'indirect measurements.' A logging measurement commonly used to infer mineralogy is induced-neutron gamma ray spectroscopy/spectrometry. Briefly, fast neutrons and thermal neutrons generated from a naturally radioactive material or pulsed-neutron generator contained within the housing of a logging sonde interact with elemental nuclei in a formation and produce, respectively, prompt (i.e., inelastic) and capture gamma radiation in a local volume surrounding the logging sonde. These produced gamma rays traverse the formation with a fraction detected by a scintillation detector contained within the housing of the logging sonde. From the detector signal is produced a spectrum containing contributions from gamma rays representing the elemental nuclei in the formation. This spectrum is typically plotted as count rate (vertical axis) versus energy (horizontal axis), and comprises information about element identity (from the characteristic energies of the gamma rays) and about element abundance (from the number of counts) for certain elements commonly found in reservoir rocks (e.g., Si, Al, Ca, Mg, K, Fe, S, etc.). This measurement of elemental abundances does not provide a direct measurement of mineralogy because the same limited number of common rock-forming elements are contained within a much larger number of common rock-forming minerals. An example is the element silicon (Si), which is present within the common sedimentary-bearing minerals quartz ($SiO_2$), opal ($SiO_2 \cdot nH_2O$), potassium feldspar ($KAlSi_3O_8$), plagioclase feldspar ($[Na,Ca]Al[Al,Si]Si_2O_8$), and numerous other silicate minerals including clay and mica group minerals. Nonetheless, there is necessarily a relationship between the bulk elemental concentrations of a rock sample and its mineral component concentrations because minerals have by their defined crystallographic structures a limited range of chemical compositions. Consequently, bulk elemental concentrations of a rock sample are dictated by the mineralogy of the rock sample.

In some embodiments, methods to derive an estimate of mineralogy from a measurement of bulk elemental concentrations may be employed. These methods may rely upon the derivation of a one or more mapping functions to forward model the prediction of mineral component concentrations from elemental concentrations. One group of methods are linear regression models based on empirical linear relationships between the concentrations of one or more elements and a one or more minerals of interest. Another group of methods are radial basis functions, alternatively referred to as nearest-neighbor mapping functions. Such methods have been applied to the determination of formation mineralogy from elemental concentrations derived from gamma ray spectroscopy logging measurements performed in a wellbore. Other methods that determine minerology data of a rock sample can also be used as well.

In some embodiments, supervised learning process 10 may use one or both of two approaches that take into account the heteroscedastic nature of input data (e.g., the varying levels of uncertainty in the NMR measurements and the different elemental features of the rock sample), the need to combine multi-fidelity datasets (e.g., core and well-logging data), and the need to obtain the output data together with their uncertainty estimates. These two approaches are Bayesian regression methods, namely a Bayesian Neural Network (BNN) and a dropout method.

Figure 5:
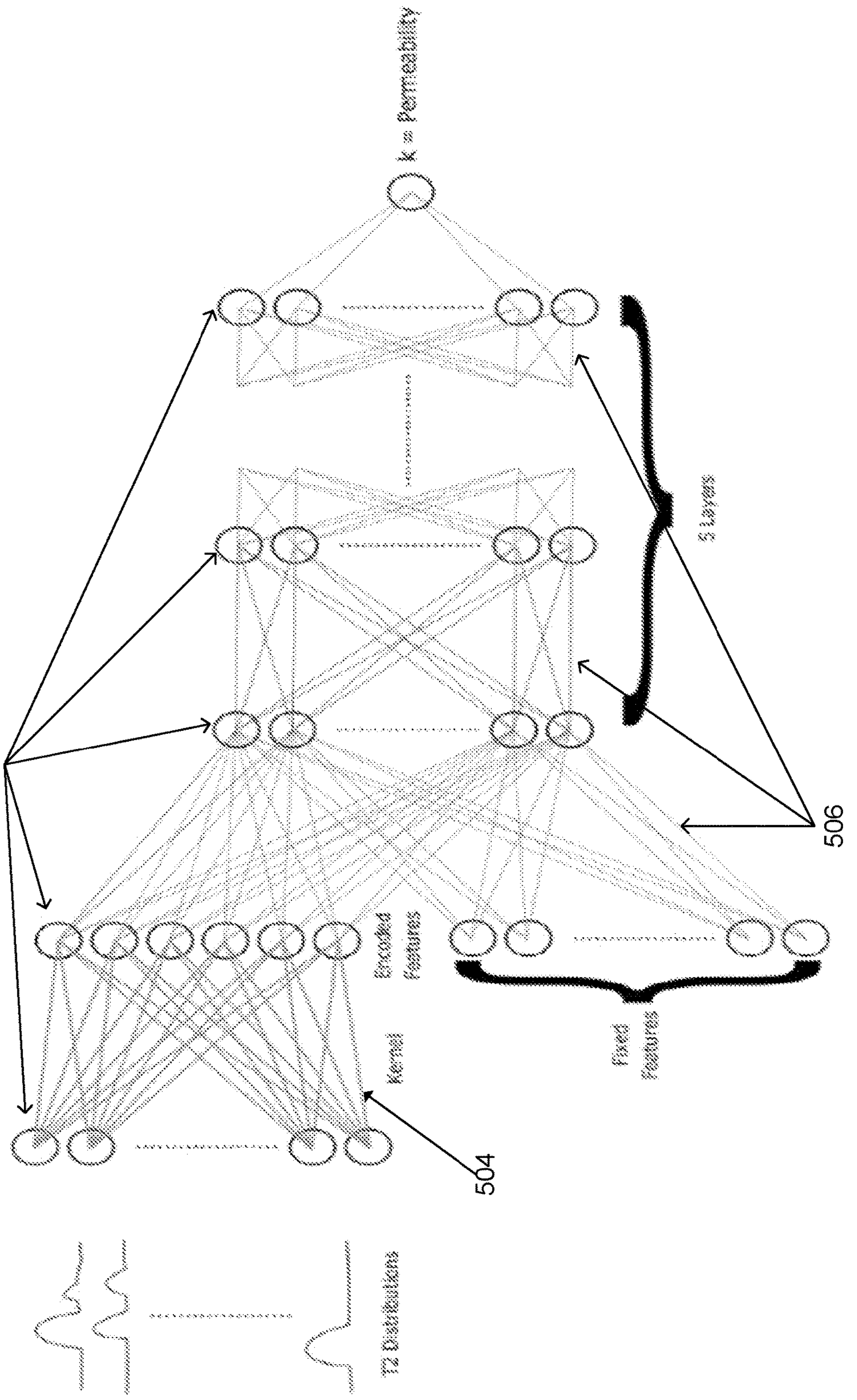
FIG. 5 is a diagram depicting an embodiment of a system in accordance with the present disclosure.

Referring now to FIG. 5, a diagram 500 showing a general structure of an artificial neural network (ANN) that may be used to implement supervised learning process 10 using the BNN method or the dropout method is provided. The ANN 502 may be configured to determine the permeability of a rock sample based on a highly non-linear combination of input features. The input features may include a predefined number (e.g., 6) $T_2$ features reduced from a $T_2$ distribution determined using an SVD-based kernel. Specifically, the $T_2$ feature data may be derived by encoding a $T_2$ distribution of a rock sample using a SVD-based kernel and then mapping the $T_2$ distribution data to $T_2$ features in a reduced dimensional space. The other input features include NMR-based input data (such as porosity, Bound Free Volume ratio, $T_2$ Logarithmic Mean) and mineralogy input data. The ANN may incorporate nonlinearity via non-linear or activation functions that are applied at each neuron of the ANN. The ANN may be trained by fixing the kernel weights 504 and updating neural network weights 506 by minimizing a MSE loss function. To improve performance, a batch normalization step may be performed at each layer of the ANN.

In some embodiments according to the present disclosure, supervised learning process 10 may utilize a computation model based on training an ANN. The computation model may further derive a value representing uncertainty associated with the estimate of permeability of the rock formation sample.

In some embodiments, according to the present disclosure supervised learning process 10 may utilize a computation model based on training an artificial neural network that employs Bayesian inference using dropout. To determine uncertainty in the prediction of permeability of the rock sample, as opposed to simply determining a point estimate of permeability, the ANN, as illustrated in FIG. 5, may be implemented as a Bayesian neural network or employ Bayesian inference using dropout.

Figure 6:
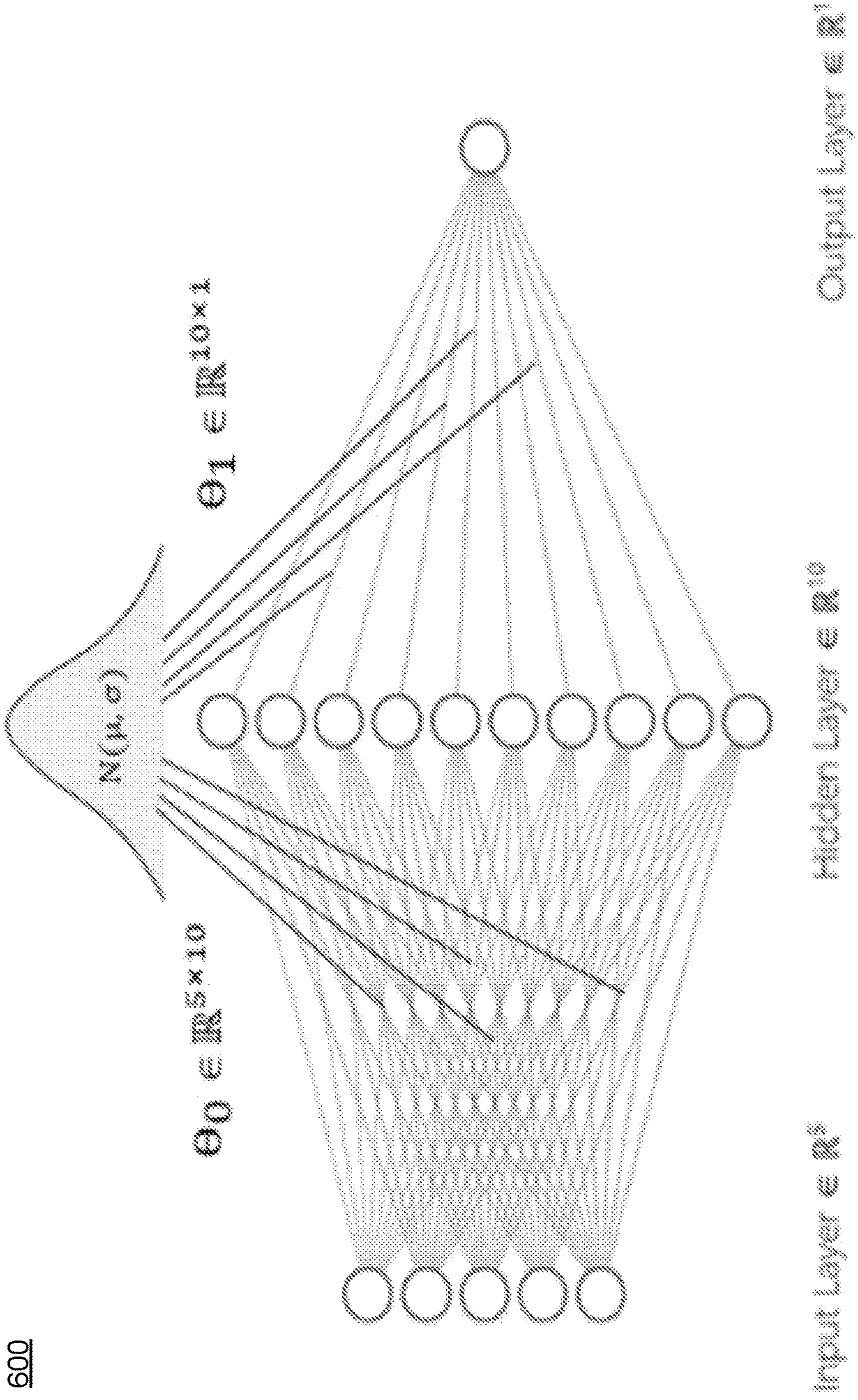
FIG. 6 is a diagram depicting an embodiment of a system in accordance with the present disclosure.

In some embodiments according to the present disclosure, supervised learning process 10 may utilize a computation model based on training a BNN. For a BNN, each weight of the BNN may be assumed to follow a normal distribution, characterized by the two parameters $\mu$ and $\sigma$ that incorporate uncertainty in the prediction of permeability, which is illustrated in FIG. 6. In general, FIG. 6 shows a simplified BNN architecture 600. By sampling from the weights of a BNN, a permeability value k may be able to be predicted along with a posterior distribution p(k). The training process for a BNN may be different since a different loss function called the evidence lower bound (ELBO) may be minimized, based on Bayesian theory, that estimates how close a true posterior distribution and an approximation of it are.

In some embodiments, an alternative way to obtain permeability uncertainty may be achieved using an ANN with dropout applied in both a training and a test stage, a process that approximates Bayesian inference. Methods such as concrete dropout, may improve this process by automating a determination of the probability parameter p, used to switch off each neuron of the ANN.

Figure 7:
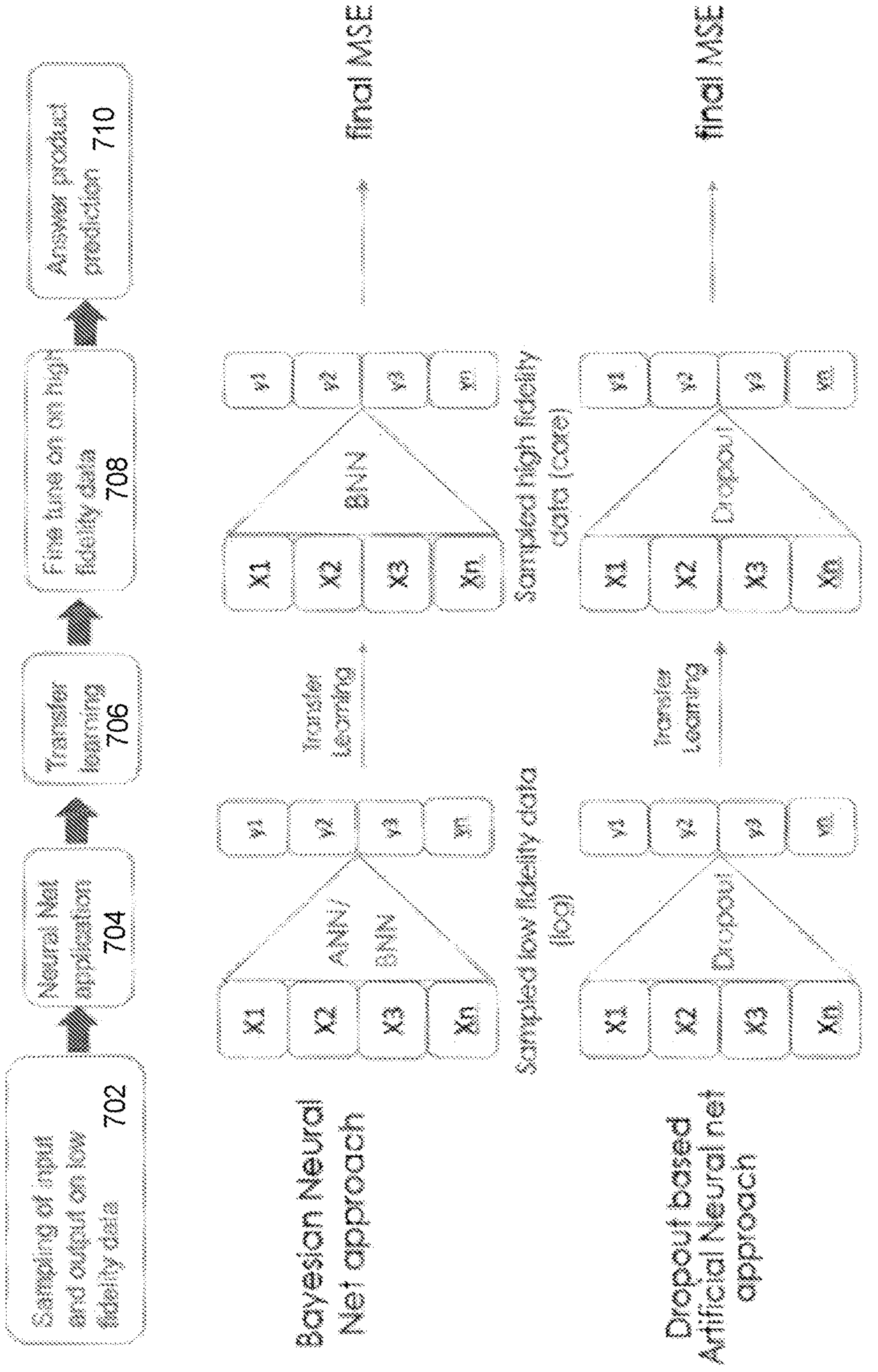
FIG. 7 is a diagram depicting an embodiment of a system in accordance with the present disclosure.

In some embodiments, in addition to providing uncertainty in an output prediction of permeability of a rock sample, the permeability determination may be obtained from heteroscedastic, multi-fidelity datasets such as those from different log and core measurements. To incorporate different uncertainties in the input features, an initial dataset may be augmented by sampling each data point around its mean using a standard deviation of the noise in each feature. By doing so, the network may be more robust to input noise data. Furthermore, if one or more data streams come from different sources (i.e., log and core) and assuming one source provides more accurate data than the other, the network may be trained in two sequential steps as shown in FIG. 7. Typically, low fidelity data would be data with lower signal to noise such as downhole log data while higher fidelity data would be that with higher signal to noise ratios, typically laboratory data or field data with station measurements. Here, the signal to noise is one of the main drivers of fidelity.

FIG. 7 illustrates the sampling 702 of input and output on low fidelity data where there is a neural net application 704. Transfer learning 706 may then be applied and the high fidelity data may be fine-tuned 708 to provide an answer product prediction 710 of permeability. Specifically, FIG. 7 shows workflows for permeability determination using a BNN or Dropout method in two separate panels. The "low fidelity" data, which is appropriately sampled using heteroscedastic noise, may be first used to train the network. This operation allows the network to reach a good local minimum, which will then be a starting point for the second step. In the second operation, transfer learning may be used to initialize the parameters of the neural network for training using the "high fidelity" data which may also be sampled for the noise in the features to determine the final network used for prediction of permeability, denoted as final MSE, and associated uncertainty of a rock sample. For each method, each method includes training on low fidelity data, transferring weights and training on high fidelity data to get the final model for permeability prediction. In this example, n may refer to a new training data set obtained for each epoch. Specifically, low fidelity data may be trained via ANN or dropout. The weight of the BNN or dropout may then be transferred where high fidelity data may be trained. A final permeability may then be predicted, denoted as final MSE.

Figure 8A:
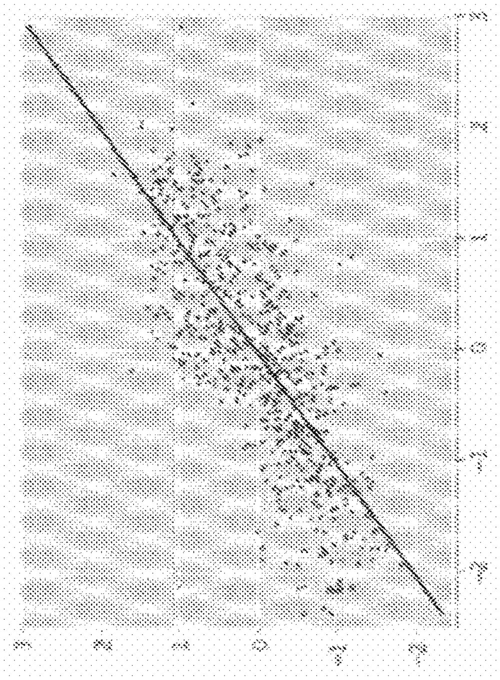
FIGS. 8A-8D are plot diagrams representing results of a supervised learning process in accordance with the present disclosure.
Figure 8B:
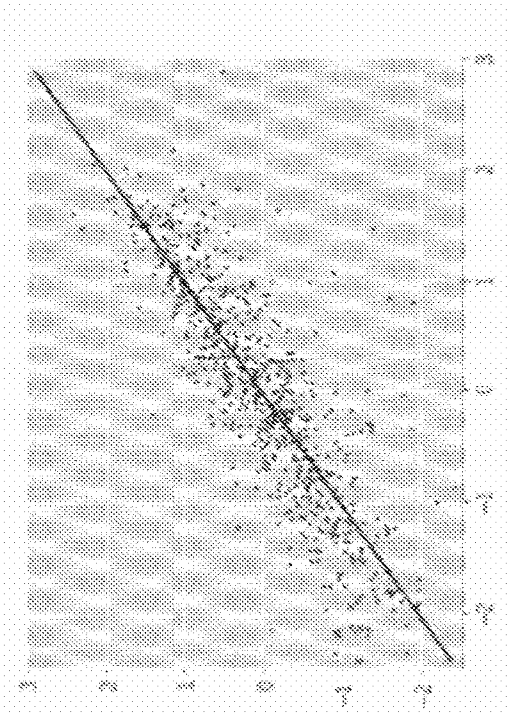
Figure 8C:
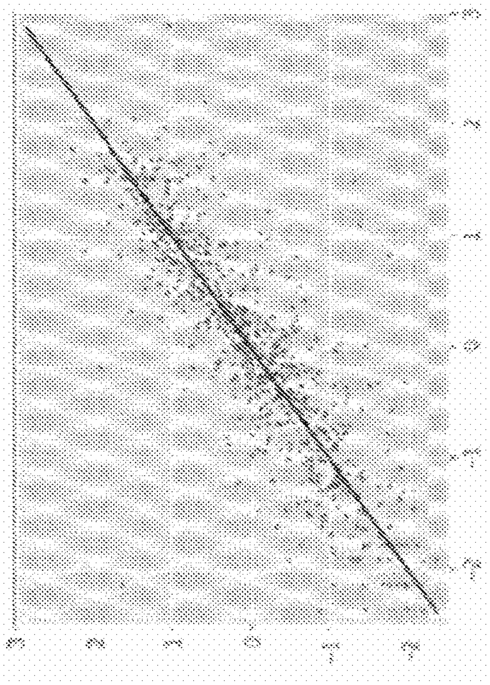
Figure 8D:
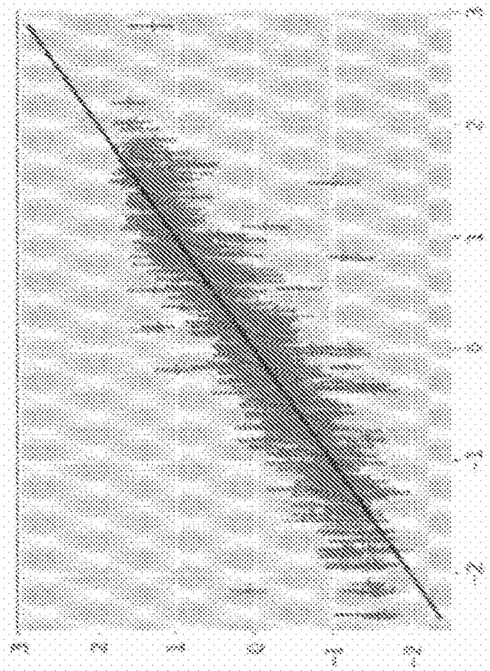

Referring now to FIGS. 8A-8D, the application of the above described techniques for permeability prediction is demonstrated. Specifically, FIG. 8A illustrates a plot of true permeability (x-axis) vs predicted permeability (y-axis) based on the model of Equation 1. This plot has a logarithmic MSE value of 0.55. FIG. 8B illustrates a plot of true permeability (x-axis) vs predicted permeability (y-axis) based on the Timur-Coates model of Equation 3. This plot has a logarithmic MSE value of 0.49. FIG. 8C is a plot of true permeability (x-axis) vs predicted permeability (y-axis) based on an ANN model of FIGS. 4 and 5. This plot has a logarithmic MSE value of 0.16. FIG. 8D is a plot of true permeability (x-axis) vs predicted permeability (y-axis) based on a BNN model of FIGS. 6 and 7. This plot has a logarithmic MSE value of 0.15. Note, that the permeability prediction is shown to be better for the Bayesian Neural Network (i.e., lower MSE values) of FIG. 8D, which may also additionally provide the permeability uncertainties, in comparison to the KSDR model as illustrated in FIG. 8A, the Timur-Coates model as illustrated in FIG. 8B or the simple artificial neural network model as illustrated in FIG. 8C.

Figure 9A:
FIGS. 9A-9B are plot diagrams representing results of a supervised learning process in accordance with the present disclosure.
Figure 9B:
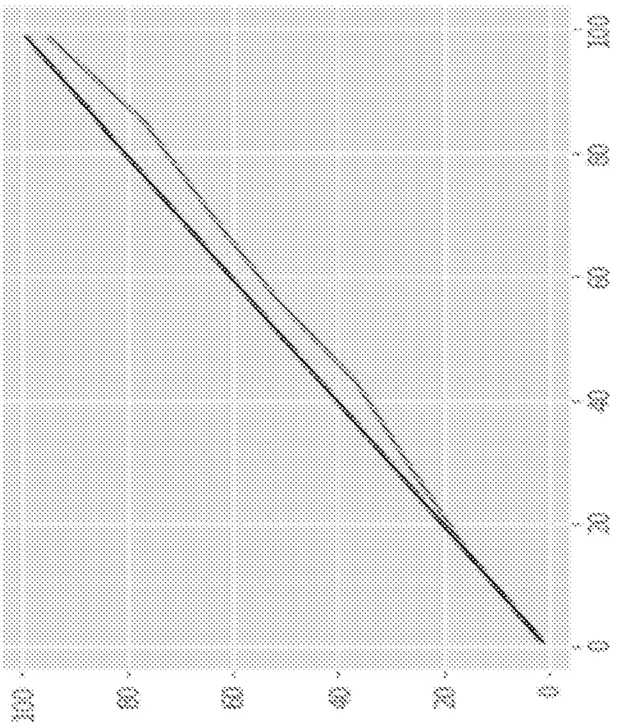

In some embodiments, an evaluation metric may be introduced for evaluating one or more predicted uncertainty values of the permeability. The uncertainty calibration metric may evaluate whether a predicted standard deviation for each permeability point is significantly close to a distance from a true permeability value. These results are summarized in the plots 900 of FIGS. 9A and 9B, where the quality of the permeability uncertainty prediction is evaluated by looking at the proximity between the two lines. Further, FIGS. 9A and 9B represent plots of the % confidence interval around the predicted premeability (x-axis) vs % predictions for which the confidence interval contains the true value (y-axis). For successive values of z € [0, 100], a point percentage is computed for which the z % confidence interval around the prediction contains the true permeability value.

In some embodiments according to the present disclosure, the plurality of data sets may include data derived from NMR measurements for the rock formation sample as well as minerology data corresponding to the rock formation sample. The rock formation sample may include, but is not limited to, rock chips, rock core, rock drill cuttings, rock outcrop, or a rock formation surrounding a borehole and coal.

In some embodiments according to the present disclosure, supervised learning process 10 introduces a probabilistic programming-based supervised machine-learning workflow oriented towards regression problems for industrial applications. This workflow addresses various challenges faced in petro-physical applications such as interpretation of subsurface multiphysics measurements.

In some embodiments according to the present disclosure, supervised learning process 10 may include obtaining a plurality of data sets characterizing a sample. The method for supervised learning of petrophysical parameters of earth formations may further include providing a neural network having one or more dropouts. A low fidelity dataset associated with the plurality of data sets may be used to train a computational model.

In some embodiments, the fidelity of a measurement may be captured in its known probability density function, often computed during calibration of associated hardware. For example, when a probability density function is multivariate Gaussian, this fidelity may be adequately captured in a covariance matrix. To honor the noise information present in inputs and outputs, sampling from the known probability density function in input feature space and output variable space may be done. One approach, referred to herein as a 'sampling' approach, is to train a neural network model directly with this sampled dataset on-the-fly (i.e., during each training epoch), and the neural network will backpropagate on a different noise realization of a training sample data set. Another approach, referred to herein as the 'autoencoder' approach, is to train an autoencoder on the dataset, where the output may be the pure dataset, and the input may be the noise-corrupted dataset generated on-the-fly. Once the training for this autoencoder has converged, and the noise model for the data has been captured by the autoencoder, then at least one parameter associated with the first autoencoder or the second autoencoder may be frozen and the encoder may be used as a denoiser for any input-output pair which may then be used to train a neural network model to learn mapping from the inputs to the outputs. However, once denoised, it is not needed to train the neural network model with data sampled on-the-fly as mentioned in the 'sampling' approach.

In some embodiments according to the present disclosure, supervised learning process 10 may utilize a computation model that includes either a BNN or standard neural networks with dropouts computational module. In this example, a cost function that is minimized during training may be engineered for specific applications. Depending on an intelligent guess provided for the posterior distribution of the dataset based on domain expertise, the distribution of the resulting likelihood may form the basis for the choice of the cost function. For example, some of the most common cost functions are the ones that arise from the assumption of Gaussian and Laplacian likelihoods (i.e., the MSE and mean-absolute error, respectively). Further, new cost functions, such as, for example, the heteroscedastic loss which may arise by assuming a heteroscedastic variance in the standard Gaussian likelihood may be generated. Currently, for neural networks with Concrete Dropout, the heteroscedastic loss for obtaining well-calibrated predictive uncertainties may be used.

In some embodiments, supervised learning process 10 may assume a high fidelity and a low fidelity data set, $(X_{HF}, y_{HF})$ and $(X_{LF}, y_{LF})$, respectively. To deal with unbalanced multi-fidelity data sets, an ANN/BNN on $(X_{LF}, y_{LF})$ may initially be trained. Further, a weights of the resulting neural network using $(X_{HF}, y_{HF})$ may be fine-tuned.

Regarding the 'sampling' approach mentioned above, a standard neural network with one or more dropouts may be used to train the computational model on the low fidelity dataset, and then fine-tune it with the high fidelity data set. When using the BNN as the neural network, a standard neural network model may be trained on the low fidelity dataset via the 'sampling' approach, the learned parameters may be transferred to the Bayesian architecture and then the Bayesian model may be fine-tuned using the high fidelity data-set. In both approaches the computational models may be updated by using different noise realizations of the input data, in each layer of the neural network, on the fly.

Figure 10:
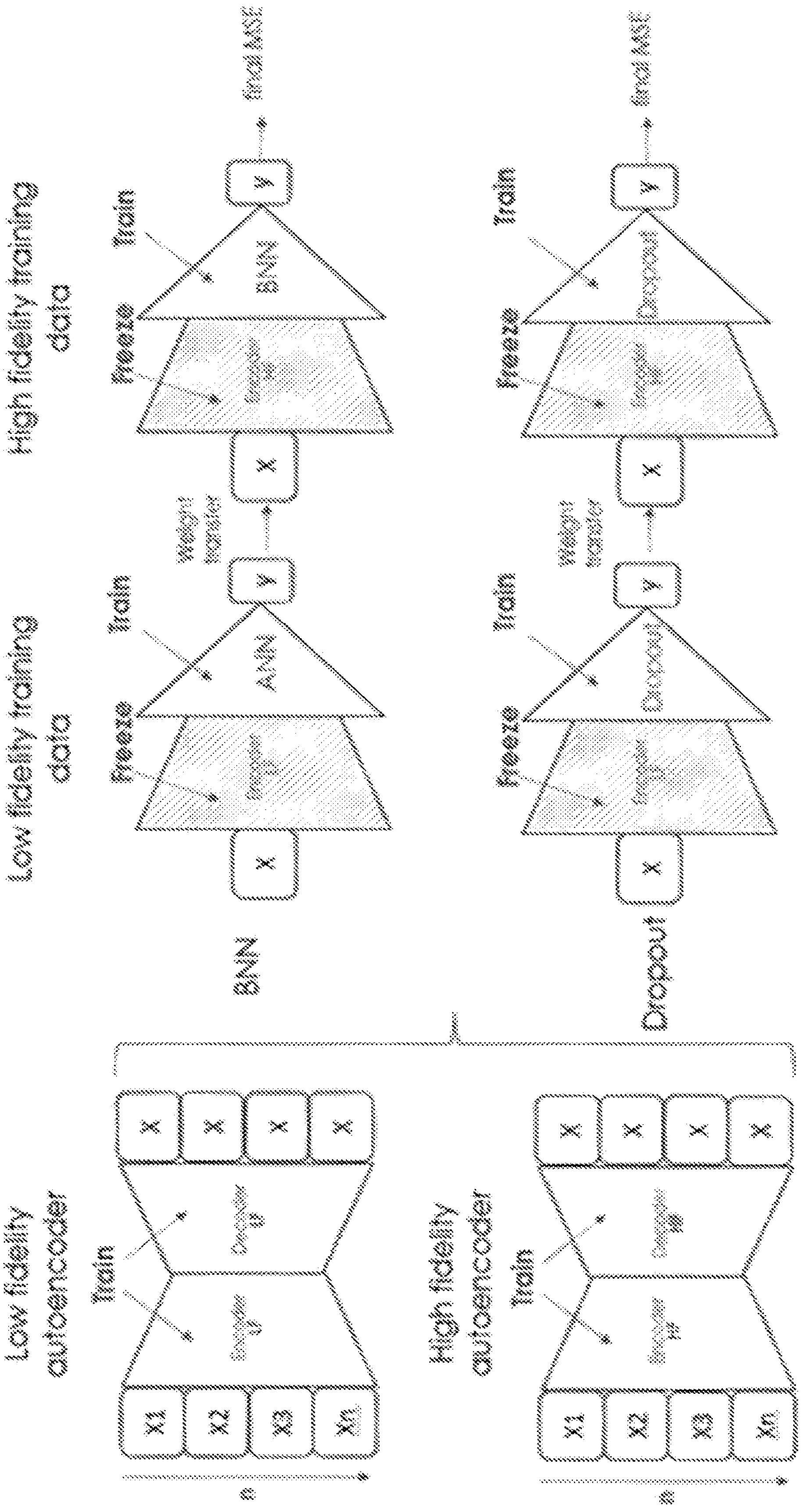
FIG. 10 is a diagram depicting an embodiment of a system in accordance with the present disclosure.

In some embodiments, and referring also to FIG. 10, supervised learning process 10 may utilize an 'autoencoder' approach. For example, a first autoencoder may be trained using the low fidelity dataset. Additionally, a second autoencoder may be trained using the high fidelity dataset. For example, when using standard neural network with dropouts, two different autoencoders may be trained, both on low fidelity and high fidelity datasets, respectively, as illustrated in FIG. 10. The low fidelity input data may be passed through a low fidelity trained encoder and used to train the computational model. The computational model may be fine-tuned further using denoised high fidelity obtained from a high fidelity trained encoder. Neural nets inside the autoencoders may also be either Dropout or BNN's, or also replaced by variational autoencoders based on the applications. When using a BNN, supervised learning process 10 remains the same as when using a standard neural network with dropouts. The only difference is that a standard neural network is trained with denoised low fidelity input, the learned parameters are transferred to a Bayesian model and the Bayesian model may be fine-tuned with denoised high fidelity input. Referencing FIG. 10 again, for both BNN and Dropout, the first step of the training may include using the low fidelity data and a frozen low fidelity encoder. Similarly, the second and last step of the training may include using the high fidelity data and the frozen high fidelity encoder in order to fine tune the weights of the BNN or Dropout model. A final permeability may then be predicted, denoted as final MSE and final MSE, respectively.

Further, regarding ways of measuring the robustness of a model, accuracy, $R^2$, may be used as well as MSE depending on the domain of application. For uncertainty, a negative log-likelihood may be used. In some embodiments according to the present disclosure, the uncertainty may be evaluated on two fronts. First, the robustness of the absolute values of one or more uncertainties may be determined. This may be measured via determining whether the ground truth lies within a x % confidence interval for x % test cases. Further, how good the one or more uncertainty values may be determined in relation to how relative they are to each other. Ideally, low uncertainties may be desired for predictions arising out of in-distribution (ID) data set and higher for OOD data set. For this purpose, AUC scores may be used. When using AUC scores, supervised learning process 10 may be modified to work in a regression setting. For example, one or more predictive uncertainties may be used as an anomaly detector to differentiate good predictions, which would usually occur for ID data set, from bad predictions, which would usually occur for OOD data-set. To evaluate AUC, one or more ground truth binary labels may be required as well as a score of a classifier. In a regression setting, the ground truth binary labels may be 1 for all ID data points and 0 for all OOD data points. Further, the score of a classifier may be the uncertainties that the model outputs for each of the ID and OOD predictions. Moreover, the use of the autoencoder technique and integration with the uncertainty metric can make this workflow very relevant for industrial problems.

There have been described and illustrated herein several embodiments of methods and systems that learn and apply a computational model that maps a set of input features to an estimate of permeability of a rock formation sample. While particular embodiments of the invention have been described, it is not intended that the invention be limited thereto, as it is intended that the invention be as broad in scope as the art will allow and that the specification be read likewise. Thus, while particular neural network architectures and workflows have been disclosed, it will be appreciated that other particular neural network architectures and workflows can be used as well. It will therefore be appreciated by those skilled in the art that yet other modifications could be made to the provided invention without deviating from its spirit and scope as claimed.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

In one aspect, any one or any portion or all of the steps or operations of the methods and processes as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The memory can be used to store any or all data sets of the methods and processes described above, such as the dataset(s) containing the NMR-derived input features for a rock sample, the T2 distributions for the rock sample, and the mineralogy data for the rock sample.

The flowcharts and block diagrams in the figures illustrate the architecture, functionality, and operation of possible implementations of systems and methods according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method comprising:

training a neural network to generate a computational model to predict permeability of a rock formation using a low fidelity training data set to determine an initial parameter, wherein the permeability includes a flow of a fluid through the rock formation;

transferring the initial parameter to initialize training using a high fidelity training data set;

fine tuning the neural network using the high fidelity training data set;

encoding, by a processor, a $T_2$ distribution of a rock formation sample of the rock formation in a first dimensional space using a Singular Valued Decomposition (SVD) based encoder to determine an encoded representation of the $T_2$ distribution in a second dimensional space and mapping the encoded representation to a reduced $T_2$ features set representing the rock formation sample, wherein the second dimensional space is smaller than the first dimensional space; and using a plurality of input data sets as an input to the computational model to determine the permeability of the rock formation and an uncertainty of the permeability, wherein the plurality of input data sets includes nuclear magnetic resonance (NMR) features of the rock formation sample, the reduced $T_2$ features set representing the rock formation sample, and mineralogy data corresponding to the rock formation sample, wherein the NMR features of the rock formation have a first fidelity and the mineralogy data have a second fidelity different than the first fidelity, and wherein the computational model derives the uncertainty of the permeability based at least in part on the first fidelity and the second fidelity.

2. The method according to claim 1, wherein the computational model is based on training an artificial neural network.

3. The method according to claim 1, wherein the computational model is based on training a Bayesian neural network.

4. The method according to claim 1, wherein the computational model is based on training an artificial neural network that employs Bayesian inference using dropout.

5. The method according to claim 1, wherein the plurality of input data sets include data derived from NMR measurements for the rock formation sample.

6. The method according to claim 1, wherein the plurality of input data sets include elemental data corresponding to the rock formation sample.

7. The method according to claim 1, wherein the rock formation sample is selected from the group consisting of rock chips, rock core, rock drill cuttings, rock outcrop, or the rock formation surrounding a borehole and coal.

8. A system comprising:

a processor;

a nonvolatile memory coupled with the processor, the nonvolatile memory storing a plurality of data sets characterizing a rock formation sample; and instructions stored in the nonvolatile memory that when implemented by the processor cause the system to:

train a neural network to generate a computational model to predict permeability of a rock formation using a low fidelity training data set to determine an initial parameter, wherein the permeability includes a flow of a fluid through the rock formation;

transfer the initial parameter to initialize training using a high fidelity training data set;

fine the neural network using the high fidelity training data set;

encode, by the processor, a $T_2$ distribution of the rock formation sample of the rock formation in a first dimensional space using a Singular Valued Decomposition (SVD) based encoder to determine an encoded representation of the $T_2$ distribution in a second dimensional space and mapping the encoded representation to a reduced $T_2$ features set representing the rock formation sample, wherein the second dimensional space is smaller than the first dimensional space; and use a plurality of input data sets as an input to the computational model to determine the permeability of the rock formation sample and an uncertainty of the permeability, wherein the plurality of input data sets includes nuclear magnetic resonance (NMR) features of the rock formation sample, the reduced $T_2$ features set representing the rock formation sample, and mineralogy data corresponding to the rock formation sample, wherein the NMR features of the rock formation have a first fidelity and the mineralogy data have a second fidelity different than the first fidelity, and wherein the computational model derives the uncertainty of the permeability based at least in part on the first fidelity and the second fidelity.

9. The system according to claim 8, wherein the computational model is based on training at least one of an artificial neural network or a Bayesian neural network.

10. The system according to claim 8, wherein the computational model is based on training an artificial neural network that employs Bayesian inference using dropout.

11. The method according to claim 1, wherein the second dimensional space includes 6 dimensions.

12. The method according to claim 11, wherein the $T_2$ distribution of the rock formation sample is encoded in the first dimensional space that includes 64 dimensions.

13. The method according to claim 1, wherein the first fidelity includes log data and the second fidelity includes ground-truth measurements.

14. The method according to claim 1, wherein the first fidelity is lower than the second fidelity.

15. The method according to claim 1, wherein the second dimensional space is at least 9% smaller than the first dimensional space.

16. The method according to claim 1, wherein the second dimensional space is no more than 10% smaller than the first dimensional space.

17. The method according to claim 1, wherein the first dimensional space includes 64 dimensions and the second dimensional space includes 6 dimensions.

18. The method according to claim 1, wherein the low fidelity training data set includes data with a lower signal to noise ratio than the high fidelity training data set.

19. The method according to claim 1, wherein the high fidelity training data set includes at least one of helium or nitrogen gas flow measurements on core samples.

20. The method according to claim 1, wherein the low fidelity training data set includes downhole log data.

* * * * *